US009813571B2

(12) United States Patent
Nishiyama

(10) Patent No.: US 9,813,571 B2
(45) Date of Patent: Nov. 7, 2017

(54) COMMUNICATION APPARATUS, METHOD OF CONTROLLING THE COMMUNICATION APPARATUS, AND STORAGE MEDIUM

(71) Applicant: CANON KABUSHIKI KAISHA, Tokyo (JP)

(72) Inventor: Masashi Nishiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/690,248

(22) Filed: Apr. 17, 2015

(65) Prior Publication Data

US 2015/0222768 A1 Aug. 6, 2015

Related U.S. Application Data

(63) Continuation of application No. 13/677,035, filed on Nov. 14, 2012, now Pat. No. 9,030,693.

(30) Foreign Application Priority Data

Nov. 17, 2011 (JP) .................................. 2011-251639

(51) Int. Cl.
G06F 3/12 (2006.01)
H04N 1/00 (2006.01)
G06K 15/02 (2006.01)
H04N 1/32 (2006.01)

(52) U.S. Cl.
CPC ......... *H04N 1/00474* (2013.01); *G06K 15/02* (2013.01); *H04N 1/0044* (2013.01); *H04N 1/00222* (2013.01); *H04N 1/00411* (2013.01); *H04N 1/32363* (2013.01); *H04N 2201/0094* (2013.01); *H04N 2201/3207* (2013.01)

(58) Field of Classification Search
None
See application file for complete search history.

(56) References Cited

U.S. PATENT DOCUMENTS

| 7,777,903 | B2 * | 8/2010 | Ohhata | H04N 1/00244 358/1.15 |
|---|---|---|---|---|
| 9,030,693 | B2 * | 5/2015 | Nishiyama | G06K 15/02 358/1.1 |
| 2006/0044621 | A1 * | 3/2006 | Ohhata | H04N 1/00244 358/438 |

(Continued)

FOREIGN PATENT DOCUMENTS

JP 2007-194752 A 8/2007

*Primary Examiner* — Marcus T Riley
(74) *Attorney, Agent, or Firm* — Canon U.S.A. Inc., IP Division

(57) ABSTRACT

A communication apparatus at a client side communicates with a server to update remote one-touch keys each time because a remote one-touch key can be deleted or added in a communication apparatus at the server side. However, a remote one-touch key selected to specify a transmission destination can be used to deselect the transmission destination. Consequently, the communication apparatus at the client side does not update the remote one-touch keys while the remote one-touch key is selected to specify the transmission destination. With the configuration, the one-touch keys provided from the communication apparatus at the server side can be used while the operability of the one-touch keys is maintained.

10 Claims, 7 Drawing Sheets

(56) References Cited

U.S. PATENT DOCUMENTS

| | | | |
|---|---|---|---|
| 2007/0070410 A1* | 3/2007 | Suzuki | H04N 1/00204 |
| | | | 358/1.15 |
| 2012/0147436 A1* | 6/2012 | Nishiyama | H04N 1/32096 |
| | | | 358/406 |
| 2013/0128308 A1* | 5/2013 | Nishiyama | G06K 15/02 |
| | | | 358/1.15 |
| 2015/0222768 A1* | 8/2015 | Nishiyama | G06K 15/02 |
| | | | 358/1.15 |

* cited by examiner

COMMUNICATION APPARATUS, METHOD OF CONTROLLING THE COMMUNICATION APPARATUS, AND STORAGE MEDIUM

CROSS-REFERENCE TO RELATED APPLICATIONS

This application is a Continuation of U.S. application Ser. No. 13/677,035 filed Nov. 14, 2012 which claims priority from Japanese Patent Application No. 2011-251639 filed Nov. 17, 2011, all of which are hereby incorporated by reference herein in their entirety.

FIELD OF THE INVENTION

The present invention relates to communication apparatuses for transmitting data to a selected transmission destination with operation of a one-touch key displayed on an operation screen.

DESCRIPTION OF THE RELATED ART

In digital multifunction peripherals, converting a scanned document into an electronic form and transmitting the document in the electronic form is generally performed. In such digital multifunction peripherals, transmission destinations that can be used in the document transmission are registered in an address book in advance, and a transmission destination is specified from the address book.

Further, in the known digital multifunction peripherals, a transmission destination to where documents are frequently transmitted can be assigned to a button referred to as one-touch key on an operation panel as a frequently used address. The use of the one-touch key enables users to specify a desired transmission destination through only a pressing operation of the one-touch key displayed on the operation panel of the digital multifunction peripheral.

In the specification of the transmission destination with the one-touch key, the user presses the one-touch key once, and in response to the pressing operation, the one-touch key becomes selected state. In other words, the transmission destination corresponding to the one-touch key becomes a state of being set as the destination of the document. The selected one-touch key is displayed in a different way (for example, color is changed) from that of a one-touch key in the deselected state. The user further presses the selected state one-touch key again, and then the selected state one-touch key becomes deselected state. As a result, the one-touch key returns to the original state. In other words, the transmission destination of the one-touch key becomes a state of not being set as the destination of the document. As described above, in response to every button pressing operation, the one-touch key is switched between the selected state and the deselected state, and the display is also switched. Consequently, the user can easily and simply set or cancel the transmission destination setting.

Japanese Patent Application Laid-Open No. 2010-233213 discusses a technique in which two digital multifunction peripherals connected to a network are defined as a server and a client in view of functional aspects, and the multifunction peripheral functioning as the client acquires an address book released by the multifunction peripheral functioning as the server.

According to such a technique, using an address book acquired from a multifunction peripheral functioning as a server, a multifunction peripheral functioning as a client can specify a transmission destination from the address book when transmitting a document. Consequently, according to Japanese Patent Application Laid-Open No. 2010-233213, in addition to the address information registered in the address book, or the like in the own apparatus, the address information registered in the address book in the other apparatus can be specified as the destination of the document.

In Japanese Patent Application Laid-Open No. 2010-233213, the apparatus at the client side does not manage the information acquired from the apparatus at the server side in associated with the selected state, that is, the state the transmission destination is set as the destination of the document, or the deselected state, that is, the state the transmission destination is not set as the destination of the document. As a result, the user cannot easily recognize whether the transmission destination acquired from the apparatus at the server side is in a state of being set as the destination of the document.

SUMMARY OF THE INVENTION

The present invention is directed to communication apparatuses configured to use a transmission destination acquired from another apparatus on a network as a transmission destination of a document, and more specifically, a communication apparatus enabling users to recognize whether an acquired transmission destination is set as a destination of a document.

According to an aspect of the present invention, a communication apparatus configured to communicate with another communication apparatus via a network is provided. The communication apparatus includes an acquisition unit configured to acquire destination information from the other communication apparatus, a storage unit configured to associate the destination information acquired by the acquisition unit with information indicating whether the destination information is set as a destination of a document, and store the information, and a display unit configured to display an item corresponding to the destination information stored in the storage unit in a display form enabling a user to recognize whether the destination information is set as the destination of the document.

According to exemplary embodiments of the present invention, users can easily recognize whether a transmission destination acquired from an apparatus at a server side is set as a destination of a document.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
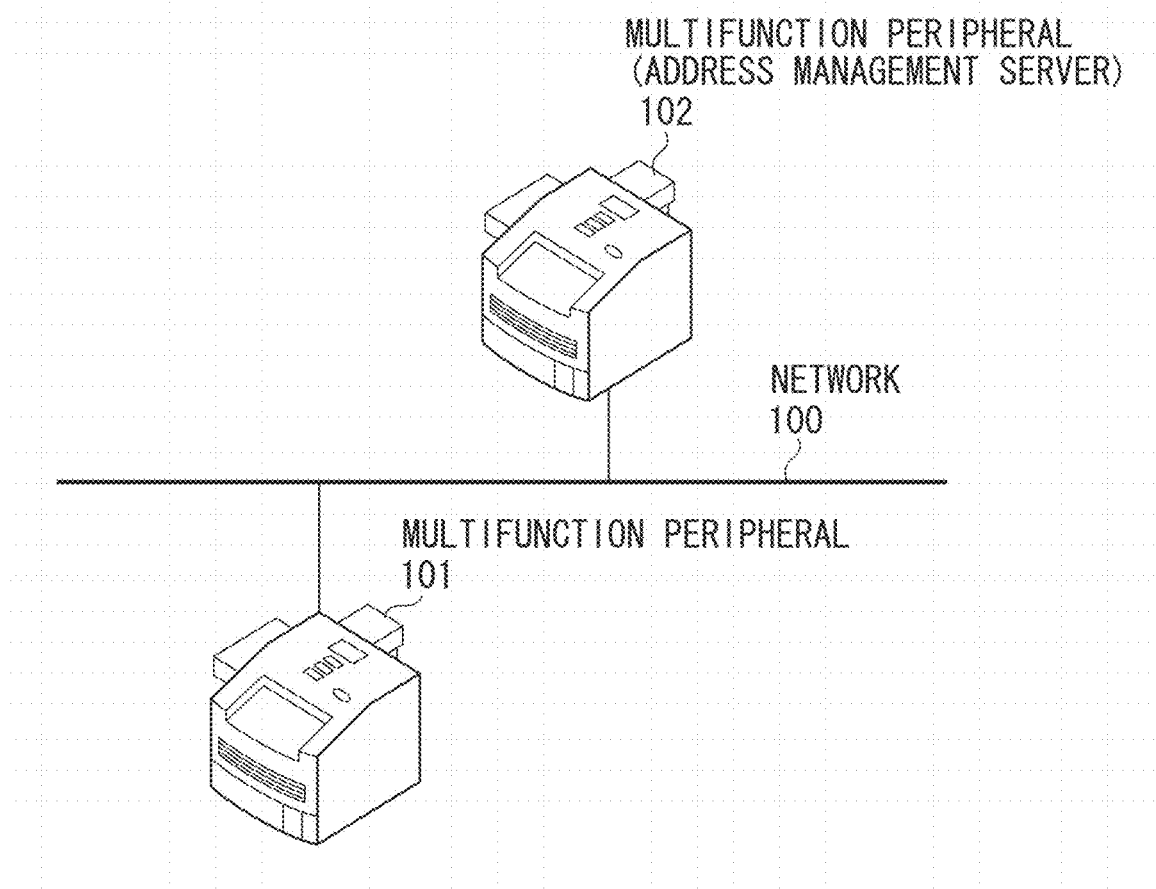
FIG. 1 illustrates a configuration of a network system including a plurality of multifunction peripherals connected to a network.

FIG. 1 illustrates a configuration of a network system including a plurality of multifunction peripherals connected to a network. In the network system, a multifunction peripheral 101 and a multifunction peripheral 102 are connected via a network 100.

The multifunction peripheral 101 according to the present exemplary embodiment has transmission functions of optically reading a paper document, converting the read document into electronic data, and transmitting the data as an electronic mail to an arbitrary transmission destination via a electronic mail server, or to a folder in a file sharing server.

In the transmission of the electronic data, the multifunction peripheral 101 can transmit the document (electronic data) using data of an address book stored in a hard disk drive (HDD) 113 of the own apparatus or using a one-touch key described below. Further, the multifunction peripheral 101 according to the present exemplary embodiment can refer to an address book and data of one-touch keys registered in the multifunction peripheral 102 having the server function, and use the information for the transmission of the document. In other words, the multifunction peripheral 101 functions as a client that uses the address book and the one-touch keys in the multifunction peripheral 102.

Meanwhile, the multifunction peripheral 102 can release the address book registered in the HDD 113 (FIG. 2) via the network 100 to the multifunction peripheral 101 and other network devices. In other words, the multifunction peripheral 102 functions as an address management server.

In addition to the above-mentioned functions, the multifunction peripherals 101 and 102 have a copying function of copying a paper document, or the like. In the present exemplary embodiment, descriptions of the functions are omitted.

The multifunction peripherals in the present exemplary embodiment are only an example of a communication apparatus. The present exemplary embodiment can be applied to communication apparatuses other than the multifunction peripherals, for example, a scanner, a facsimile machine, a copying machine, a printer, and the like, or a personal computer, a mobile terminal, and the like.

Figure 2:
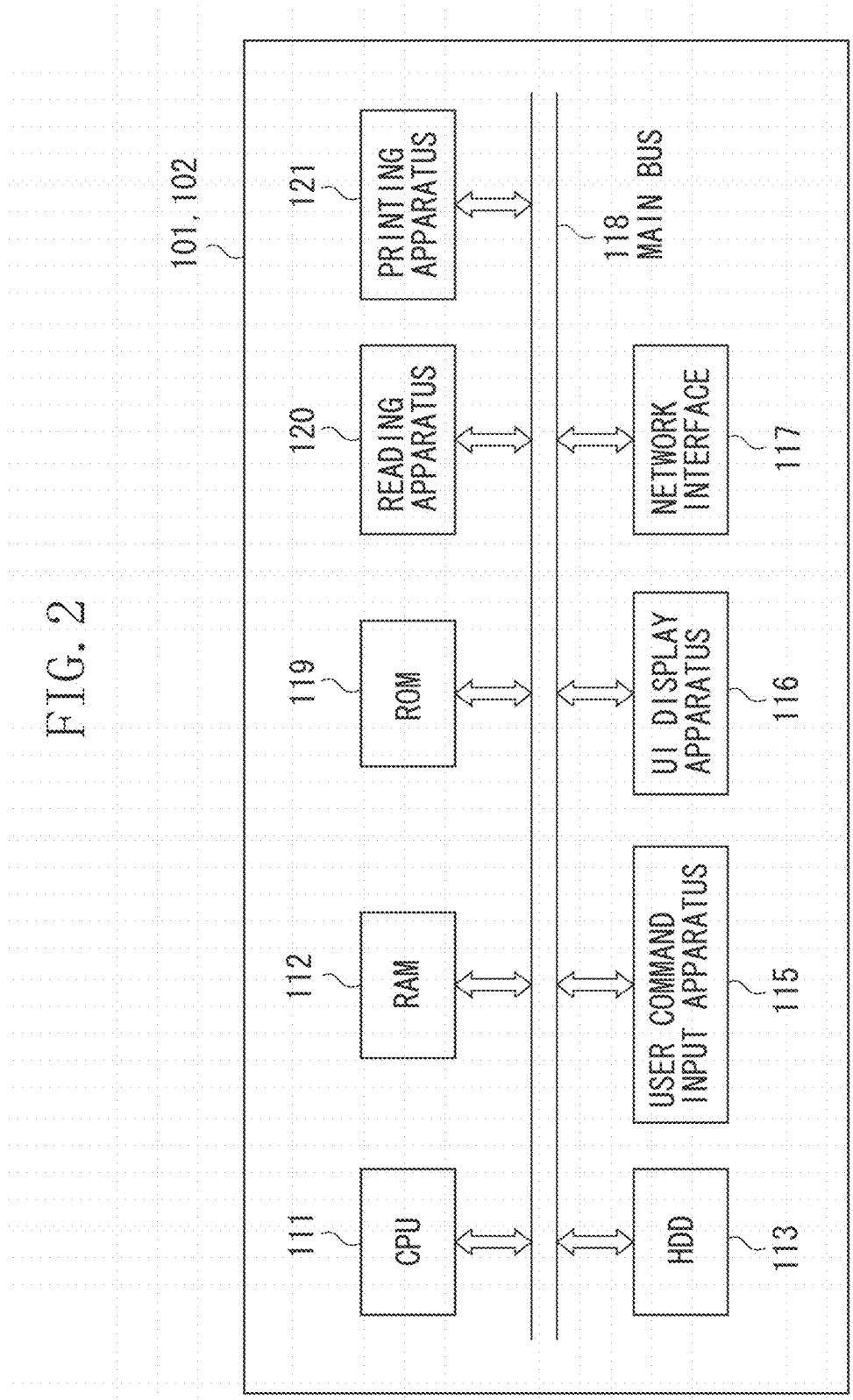
FIG. 2 illustrates a hardware configuration of multifunction peripherals.

FIG. 2 illustrates a hardware configuration of the multifunction peripheral 101 and the multifunction peripheral 102 illustrated in FIG. 1. A central processing unit (CPU) 111 controls the multifunction peripheral 101. A RAM 112 provides a work area of the CPU 111. The HDD 113 stores various settings such as one-touch key data described below. A read-only memory (ROM) 119 stores a program that implements individual processes described in the present exemplary embodiment. A user command input apparatus 115 is used to input a command by a user (including users, installation personnel). An user interface (UI) display apparatus 116 performs screen display. A network interface 117 communicates with other apparatuses via the network. The multifunction peripheral 101 includes amain bus 118. The multifunction peripheral 101 further includes a reading apparatus 120 that optically reads an original document and converts the read document into image data and a printing apparatus 204 that prints the image data.

Unless not specifically mentioned, in the present exemplary embodiment, in the multifunction peripheral 101 and the multifunction peripheral 102, the CPU 111 controls the RAM 112, the HDD 113, the user command input apparatus 115, the UI display apparatus 116, and the network interface 117 via the main bus 118 to implement the processes.

Figure 3:
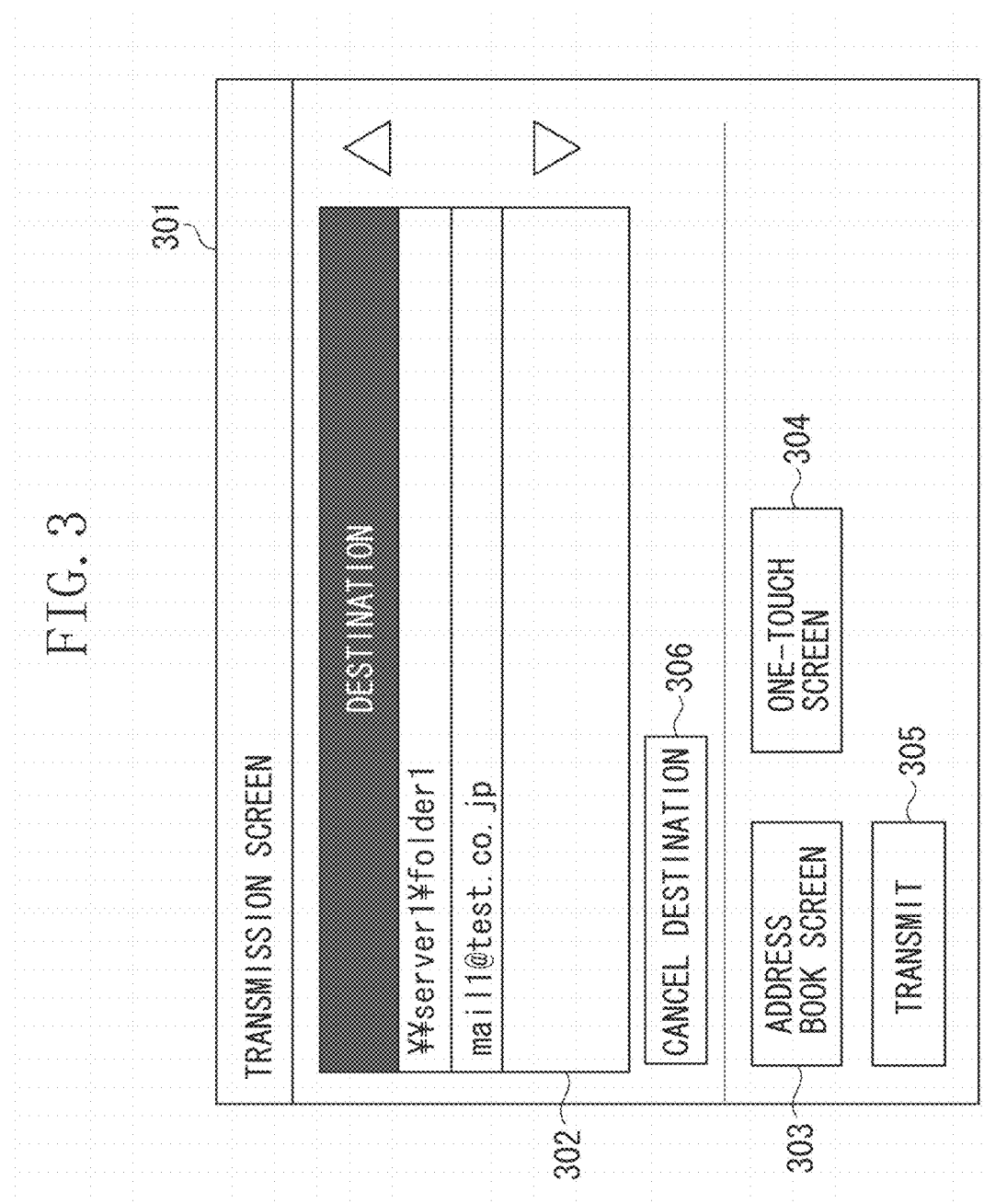
FIG. 3 illustrates a transmission screen for transmitting a document scanned in the multifunction peripheral.

FIG. 3 illustrates a transmission screen 301 for transmitting a document (electronic data) scanned and generated in the multifunction peripheral 101. The transmission screen 301 in FIG. 3 is displayed on the UI display apparatus 116 in FIG. 2.

The UI display apparatus 116, in response to pressing operation of an address bock screen button 303, displays an address book (not illustrated in the present exemplary embodiment) stored in the HDD 113 in the multifunction peripheral 101 itself, or an address book (not illustrated in the present exemplary embodiment) registered in the multifunction peripheral 102 functioning as server. The UI display apparatus 116 can set a transmission destination selected from the displayed address book by the user to a selected destination display area 302 as a transmission destination of the document.

Figure 4:
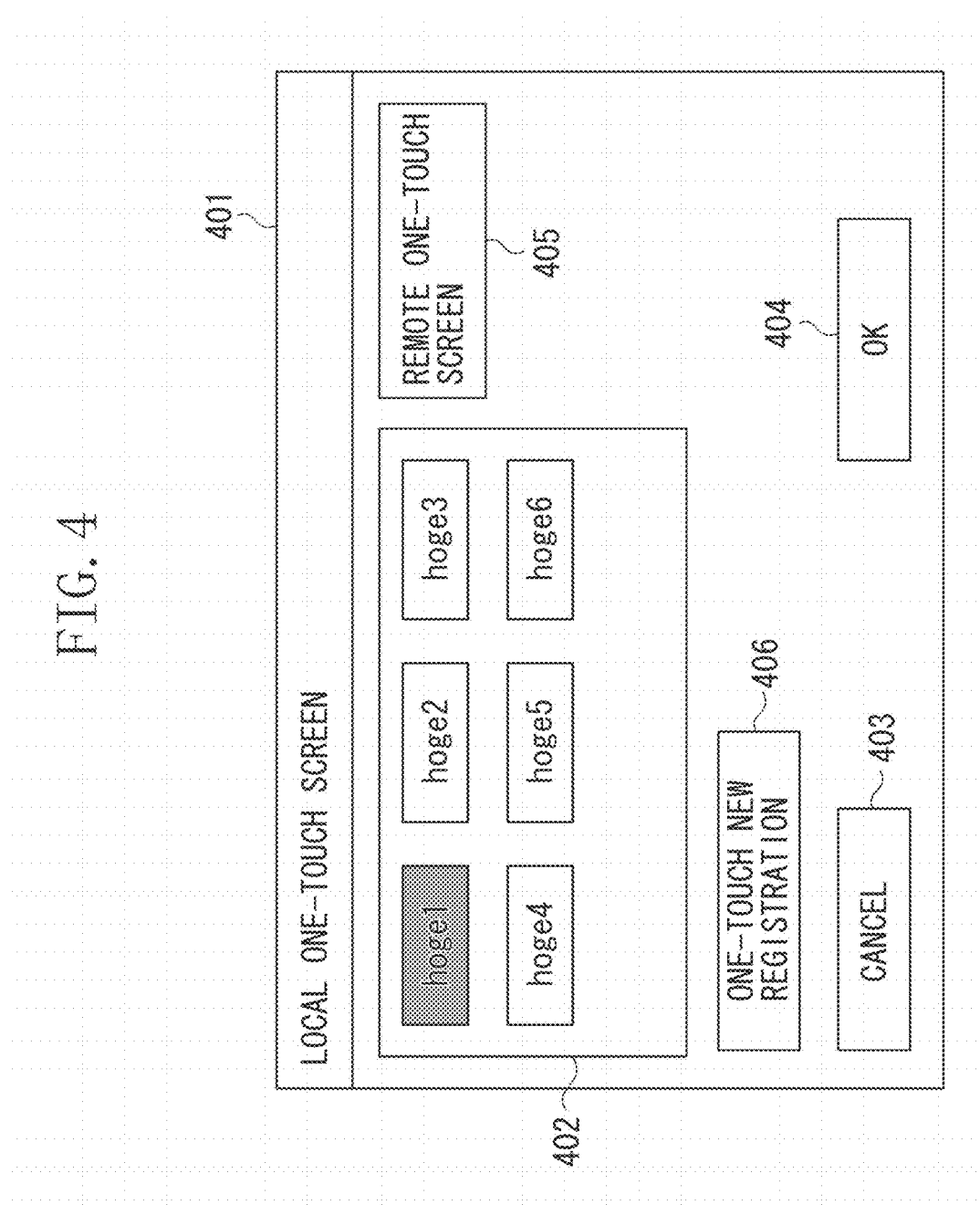
FIG. 4 illustrates a local one-touch screen displayed in response to pressing operation of a one-touch screen button on the transmission screen.
Figure 5:
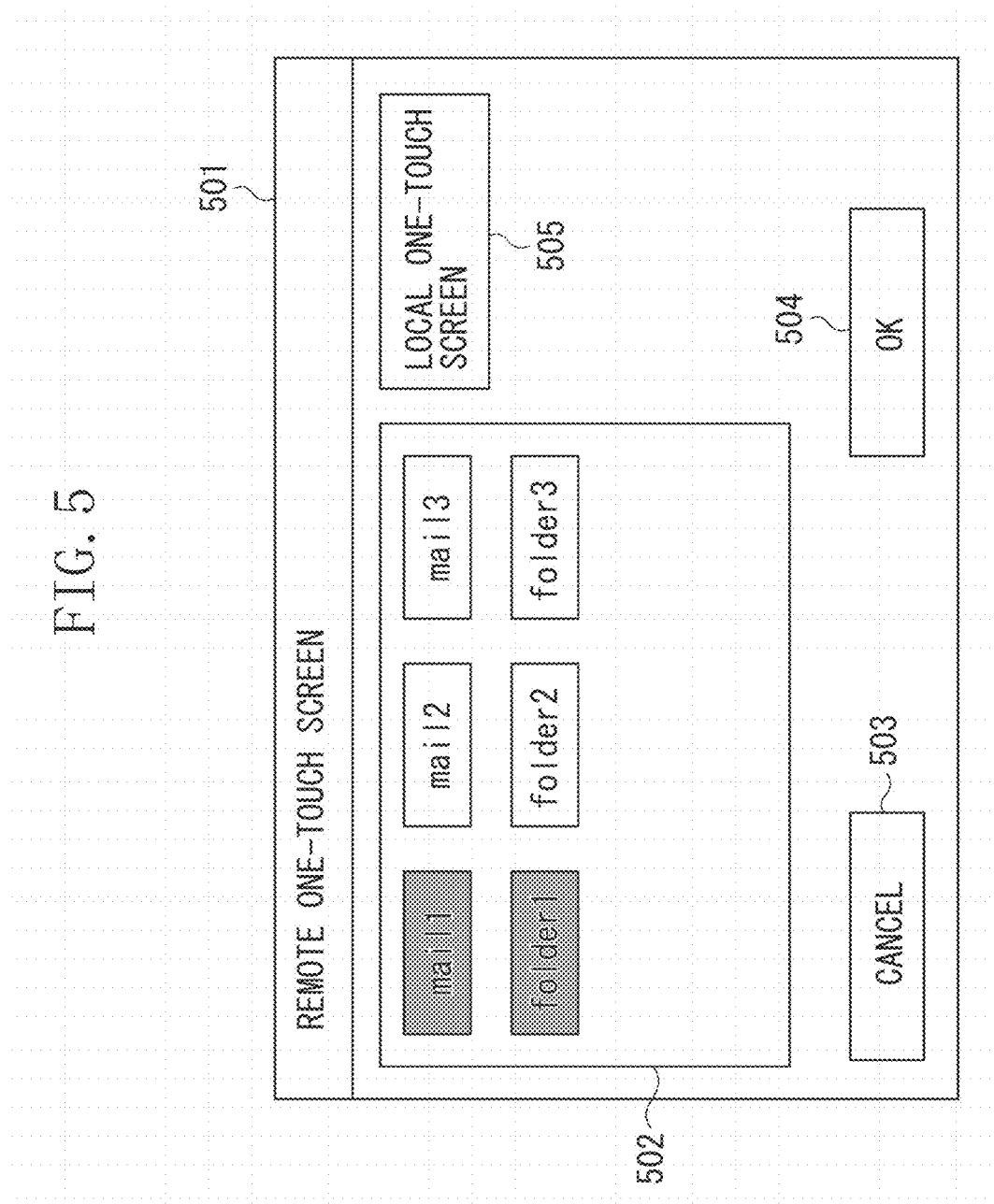
FIG. 5 illustrates a remote one-touch screen displayed in response to pressing operation of a remote one-touch screen button on the local one-touch screen.

Meanwhile, in response to pressing operation of a one-touch screen button 304 by the user, the UI display apparatus 116 displays a one-touch screen like the screen illustrated in FIG. 4 or FIG. 5. On the displayed one-touch screen, in response to pressing operation of a one-touch key by the user, the UI display apparatus 116 sets the transmission destination stored associated with the one-touch key to the selected destination display area 302 as a transmission destination of the document.

The user can cancel the selection of the transmission destination selected by the user and set to the selected destination display area 302 by pressing a destination cancel button 306.

In a case where a plurality of transmission destinations are set to the selected destination display area 302, in each pressing operation of the destination cancel button 306, the setting of one transmission destination is canceled. Specifically, the selection is canceled in the order from the transmission destination displayed at the end in the selected destination display area 302. For example, in the example illustrated in FIG. 3, in the selected destination display area 302, the transmission destination "¥¥server1¥folder1", and the transmission destination"mail1@test.co.jp" are set. The user presses the destination cancel button 306 once and then the setting of the transmission destination "mail1@test.co.jp" is canceled. The user further presses the destination clear button 306 and then the setting of the transmission destination "¥¥server1¥folder1" is canceled.

The user instructs transmission of the document by pressing a transmission button 305, and in response to the instruction, the processing for transmitting the document to the transmission destination set in the selected destination display area 302 is started. According to the instruction of the CPU 111, the transmission of the document data via the network interface 117 is performed.

FIG. 4 illustrates a local one-touch screen 401 displayed in response to the pressing operation of the one-touch screen button 304 on the transmission screen 301 in FIG. 3. The local one-touch screen 401 is displayed on the UI display apparatus 116. In a local one-touch key display area 402, buttons (hereinafter, referred to as local one-touch keys) associated with the transmission destinations stored in the multifunction peripheral 101 are displayed. In the present exemplary embodiment, it is assumed that the user associates information of desired transmission destinations with the one-touch keys and stores the associated information in the HDD 113 in the multifunction peripheral 101 in advance.

In response to the reception of pressing operation of an OK button 404 while a local one-touch key displayed in the local one-touch key display area 402 is selected, the screen returns from the local one-touch screen 401 in FIG. 4 to the transmission screen 301 in FIG. 3. In such a state, in the selected destination display area 302 in FIG. 3, the transmission destination corresponding to the local one-touch key selected from the local one-touch key display area 402 in FIG. 4 is set.

The local one-touch keys displayed in the local one-touch key display area 402 are displayed according to local one-touch key data (described below) read from the HDD 113 into the RAM 112. The reading operation of the local one-touch key data is performed at a timing the one-touch screen button 304 is pressed.

The one-touch key data read into the RAM. 112 is erased from the RAM 112 when the transmission button 305 is pressed and the transmission of the document is started or a reset key (not illustrated) is pressed. The local one-touch key is stored in the RAM 112 together with the information the local one-touch key is currently being selected by the user or not. In other words, the local one-touch key is stored in the RAM 112 always associated with the selected state or the deselected state.

The local one-touch key in the selected state is displayed in the local one-touch key display area 402 in a form distinguishable from the local one-touch keys in the deselected state. For example, the one-touch key button in the selected state may be displayed in a color different from the other buttons. The user presses the local one-touch key in the selected state again, so that the color returns to the original color and the local one-touch key returns to the deselected state, and the setting of the transmission destination set to the selected destination display area 302 in FIG. 3 is also canceled.

In the present exemplary embodiment, the multifunction peripheral 101 stores all of the selected or deselected states of the local one-touch keys displayed in the local one-touch key display area 402 into the RAM 112 in the multifunction peripheral 101. Consequently, each of the setting of a transmission destination and the cancellation of the setting of the transmission destination can be implemented with the simple and easy pressing operations of the local one-touch key.

In a case where the user presses the transmission button 305 to start the transmission of the document, or presses the reset key, as described above, the local one-touch key data is erased from the RAM 112. Consequently, the selected state of the one-touch key is also cleared.

In response to the pressing operation of the transmission button 305, the transmission of the document data is started, and the selected or deselected states of the local one-touch keys stored in the RAM 112 in the multifunction peripheral 101 are cleared. When the reset button (not illustrated) is pressed or an auto clear event occurs, the selected or deselected states of the local one-touch keys stored in the RAM 112 in the multifunction peripheral 101 are also cleared. The auto clear event is an event generated when no user operation is performed for a certain period of time. When the auto clear event is generated, processing similar to that performed in response to the pressing operation of the reset button is performed.

FIG. 5 illustrates a remote one-touch screen 501 displayed in response to the pressing operation of a remote one-touch screen button 405 on the local one-touch screen in FIG. 4. The remote one-touch screen 501 is displayed on the UI display apparatus 116. In a remote one-touch key display area 502, via the network 100, one-touch keys (hereinafter, referred to as remote one-touch keys) corresponding to the information of transmission destinations stored in the HDD 113 in the multifunction peripheral 102 can be displayed.

In the present exemplary embodiment, the multifunction peripheral 102 associates the information of desired transmission destinations with the remote one-touch keys and stores the associated information in the HDD 113 in the multifunction peripheral 102 in advance. The remote one-touch keys function as local one-touch keys in the multifunction peripheral 102.

The user selects a remote one-touch key displayed in the remote one-touch key display area 502, so that the remote one-touch key becomes in a selected state. The remote one-touch key in the selected state is displayed in the remote one-touch key display area 502 in a form distinguishable from the remote one-touch keys in the deselected state. For example, the one-touch key button in the selected state may be displayed in a color different from the other buttons. In response to the pressing operation of an OK button 504 in the selected state, the transmission destination assigned to the remote one-touch key in the selected state is set to the selected destination display area 302 in FIG. 3.

The multifunction peripheral 101 stores all of the selected or deselected states of the remote one-touch keys displayed in the remote one-touch key display area 502 in the RAM 112 in the multifunction peripheral 101. The user presses the remote one-touch key in the selected state again, so that the reversed color state returns to the original color state and the remote one-touch key returns to the deselected state, and the setting of the transmission destination set to the selected destination display area 302 in FIG. 3 is canceled.

As described above, during the screen transfer in FIGS. 3 to 5, the information about the selected state or deselected state of the one-touch keys by the user is always stored in the RAM 112. Consequently, the user can set a transmission destination to the selected destination display area 302 or cancel the transmission destination set to the selected destination display area 302 by pressing the one-touch key in the deselected state or pressing the one-touch key in the selected state.

Figure 6A:
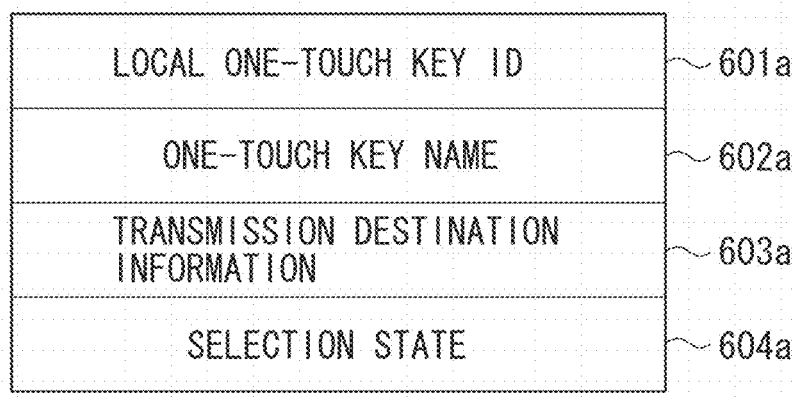
FIGS. 6A and 6B schematically illustrate one-touch key data stored in a random access memory (RAM) in the multifunction peripheral.
Figure 6B:
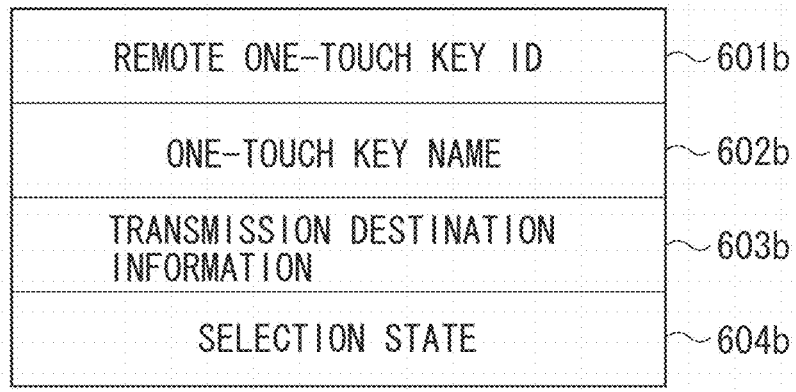

FIGS. 6A and 6B schematically illustrate the one-touch key data read into the RAM 112 of the multifunction peripheral 101.

The one-touch key data in FIG. 6A is data (hereinafter, referred to as local one-touch key data) necessary for displaying the local one-touch keys on the local one-touch screen in FIG. 4. The local one-touch key data is read from the HDD 113 into the RAM 112 at a timing the one-touch screen button 304 is pressed. The local one-touch key data read into the RAM 112 is read and displayed on the screen.

The one-touch key data in FIG. 6B is data necessary for displaying the remote one-touch keys on the remote one-touch screen in FIG. 5. The multifunction peripheral 101 receives an instruction for displaying the remote one-touch screen, specifically, the instruction is the pressing operation of the remote one-touch screen button 405 by the user. In response to the reception, the multifunction peripheral 101 acquires the one-touch key data registered in the multifunction peripheral 102 on the network 100. The multifunction peripheral 101 displays the data on the screen while storing the data in the RAM 112.

The one-touch key data includes a one-touch key ID 601, the name of the one-touch key 602, transmission destination information 603, and an attribute value of a selection state 604.

As illustrated in FIG. 6A, the local one-touch key ID 601*a* is identification information for identifying a local one-touch key. Based on the local one-touch key ID 601*a*, the UI display apparatus 116 locates a button of the local one-touch key at a predetermined position in the local one-touch key display area 402, and displays the button.

A one-touch key name 602*a* is a character string displayed together with the button in the display of the one-touch key specified by the local one-touch key ID 601*a*.

The transmission destination information 603*a* is the information of the transmission destination assigned to the one-touch key, for example, an electronic mail address or a folder path of the destination apparatus.

The attribute value 604*a* indicates whether the local one-touch key is in a selected state or in a deselected state. Each time the user presses the button of the local one-touch key once, the selected state and the deselected state are alternately switched.

FIG. 6B illustrates one-touch key data for displaying a remote one-touch key on the screen in FIG. 5.

A remote one-touch key ID 601*b* is identification information for identifying a remote one-touch key. Based on the remote one-touch key ID 601*b*, the UI display apparatus 116 locates a button of the remote one-touch key at a predetermined position in the remote one-touch key display area 502, and displays the button. A one-touch key name 602*b* is a character string displayed together with the button in the display of the remote one-touch key specified by the remote one-touch key ID 601*b*. Transmission destination information 603*b* is the information of the transmission destination assigned to the remote one-touch key, for example, an electronic mail address or a folder path of the destination apparatus. An attribute value 604*b* indicates whether the remote one-touch key is in a selected state or in a deselected state. Each time the user presses the button of the remote one-touch key once, the selected state and the deselected state are alternately switched.

Figure 7:
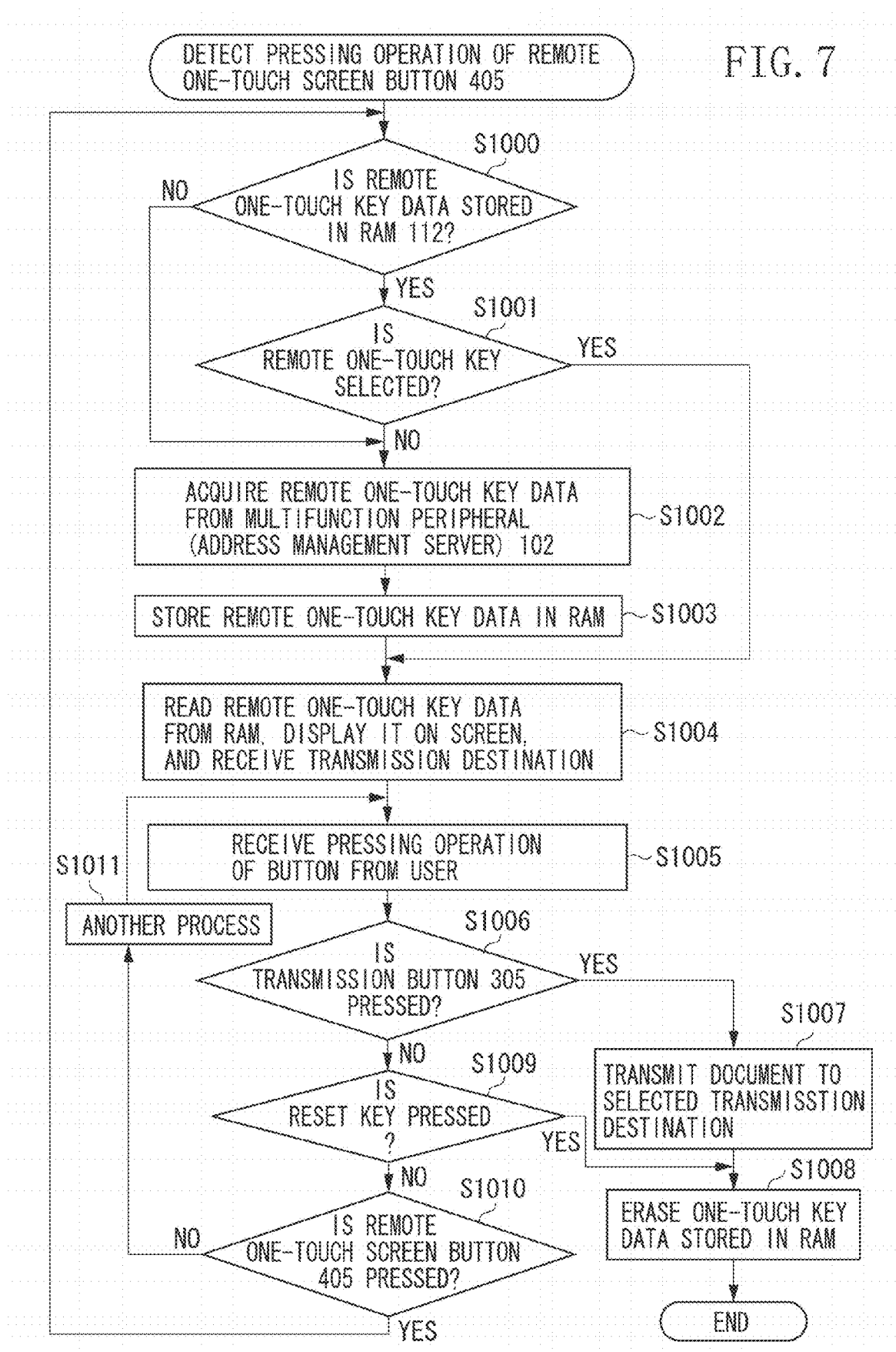
FIG. 7 is a flow chart illustrating processing implemented by the multifunction peripheral when displaying the remote one-touch screen.

FIG. 7 is a flowchart illustrating processing implemented by the multifunction peripheral 101 in displaying the remote one-touch screen 501. The program for implementing the processing illustrated in the flow chart is stored in the ROM 119, and the program is executed by the CPU 111.

In step S1000, the multifunction peripheral 101 detects pressing operation of the remote one-touch screen button 405 on the screen 401 in FIG. 4 by the user. In response to the button pressing operation of the remote one-touch screen button 405, the multifunction peripheral 101 determines whether remote one-touch key data is already stored in the RAM 112. For example, in a case where the user presses the remote one-touch screen button 405 first, both local one-touch data and remote one-touch data are not yet stored in the RAM 112, and consequently, it is determined to be NO in step S1000. Further, if the reset key is pressed or the transmission of the document is started, the one-touch key data stored in the RAM 112 is erased. Consequently, after the user presses the reset key or the user presses the remote one-touch screen button 405 after the transmission of the document is started, the one-touch key data is not stored in the RAM 112 either. In such a case, it is determined to be NO in step S1000.

Meanwhile, after the remote one-touch screen 501 in FIG. 5 is displayed once, if the screen transfers to another screen and the user presses the remote one-touch screen button 405 without pressing the reset key or the transmission button 305, it is determined to be YES in step S1000.

In step S1001, the multifunction peripheral 101 checks the selected or deselected states of the remote one-touch keys from the RAM 112 in the multifunction peripheral 101, and determines whether there is a remote one-touch key in the selected state.

For example, after the user selects the remote one-touch key once on the remote one-touch screen 501, the screen transfers to another screen, and the user presses the remote one-touch screen button 405 again, in step S1001, it is determined to be YES.

The process in step S1002 is executed if the remote one-touch key data is not stored in the RAM 112 (NO in step S1000) or the remote one-touch key data is stored in the RAM 112, but there is no remote one-touch key in the selected state (NO in step S1001). In step S1002, the multifunction peripheral 101 acquires the data of the remote one-touch keys stored in the HDD 113 in the multifunction peripheral (address management server) 102. Specifically, the multifunction peripheral 101 acquires the remote one-touch key IDs, the names of the buttons of the remote one-touch keys, and the destination information assigned to the remote one-touch keys. The destination information is, for example, an electronic mail address, a folder path, or a facsimile number.

In step S1003, the multifunction peripheral 101 stores the data of the remote one-touch keys acquired in step S1002 into the RAM. 112 in the multifunction peripheral 101. In step S1004, the multifunction peripheral 101 reads the data of the remote one-touch keys from the RAM 112, and displays the data in the remote one-touch key display area 502. In the process, if the remote one-touch key data is already stored in the RAM 112, the multifunction peripheral 101 updates the remote one-touch key data to the data of the remote one-touch keys newly acquired in step S1002.

Meanwhile, in step S1001, if the multifunction peripheral 101 determines that at least one remote one-touch key in the selected state exists, the multifunction peripheral 101 does not acquire the remote one-touch key data from the multifunction peripheral 102, and the process proceeds to step S1004. In step S1004, the multifunction peripheral 101 reads the remote one-touch key data already stored in the RAM 112 in the multifunction peripheral 101, that is, the data acquired from the multifunction peripheral 102 in the past, and displays the remote one-touch keys in the remote one-touch key display area 502. The multifunction peripheral 101 receives selection of a transmission destination by the user via the remote one-touch key displayed in the remote one-touch key display area 502. The user can select the transmission destination by operating the remote one-touch key displayed in the remote one-touch key display area 502 in step S1004, or via the screen in FIG. 4. Alternatively, the user can select the transmission destination from a selection screen (not illustrated) of an address book, or directly input and specify the transmission destination via a key board. The multifunction peripheral 101 sets the transmission destination selected using the various methods by the user as the destination of the document. After the operation, when the screen transfers to the screen in FIG. 3, the process proceeds to step S1005.

In step S1005, the multifunction peripheral 101 receives pressing operation of the button from the user in the state the screen in FIG. 3 is displayed.

In step S1006, the multifunction peripheral 101 detects whether the transmission button 305 on the screen in FIG. 3 is pressed. If the multifunction peripheral 101 detects that the transmission button 305 is pressed (YES in step S1006), the process proceeds to step S1007. In step S1007, the multifunction peripheral 101 controls the reading apparatus 120 and the network interface 117, and transmits the data to the apparatus indicated by the selected transmission destination. The data to be transmitted is generated by reading the document with the reading apparatus 120 as the image data and converting into a file format that can be transmitted using an electronic mail protocol, or a file transmission protocol. Alternatively, the file stored in the HDD 113 can be transmitted.

In response to the start of the data transmission in step S1007, in step S1008, the CPU 111 in the multifunction peripheral 101 erases the one-touch key data stored in the RAM 112. In the process, the multifunction peripheral 101 erases from the RAM 112 the local one-touch key data read from the HDD 113 together with the remote one-touch key data acquired from the multifunction peripheral 102.

In step S1009, the multifunction peripheral 101 detects whether the user presses the reset key (not illustrated). If the multifunction peripheral 101 determines that the reset key is pressed (YES in step S1009), the process proceeds to step S1008. If not (NO in step S1009), the process proceeds to step S1010.

In step S1010, the multifunction peripheral 101 detects whether the user presses the remote one-touch screen button 405 again. In step S1010, if the multifunction peripheral 101 determines that the user presses the remote one-touch screen button 405 (YES in step S1010), the process returns to step S1001. If the multifunction peripheral 101 determines to be NO, that is, if the multifunction peripheral 101 determines that the user operates a button other than the transmission button 305, the reset key, and the remote one-touch screen button 405 (NO in step S1010), the process proceeds to step S1011. In step S1011, the multifunction peripheral 101 executes a predetermined process corresponding to the button pressed by the user in step S1005, and the process returns to step S1005. For example, if the address book screen 303 is pressed, the multifunction peripheral 101 performs a process for selecting a destination from the address book, and setting the destination as the destination of the document.

According to the present exemplary embodiment, when the remote one-touch screen button 405 is pressed again and no remote one-touch key in the selected state exists, the multifunction peripheral 101 newly acquires the remote one-touch keys from the multifunction peripheral (address management server) 102. Consequently, for example, in a case where a transmission destination of the remote one-touch key is changed at the multifunction peripheral 102 side from the previous acquisition state of the remote one-touch key data, the changed remote one-touch key data can be displayed at the side of the multifunction peripheral 101.

Meanwhile, if the remote one-touch screen button 405 is pressed again, and there is a remote one-touch key in the selected state, the multifunction peripheral 101 reads the remote one-touch key data in the RAM without acquiring the remote one-touch key data from the multifunction peripheral 102, and displays the data. This operations is performed to solve the problem that can occur when one-touch key data that had been existed in the multifunction peripheral (address management server) 102 at the time of the acquisition of the previous remote one-touch key data has been erased in the multifunction peripheral 102 when the button is pressed in step S1010. In such a case, if the remote one-touch key being selected at the side of the multifunction peripheral 101 has been erased at the side of the multifunction peripheral 102, the multifunction peripheral 101 can newly acquire the remote one-touch key data from the multifunction peripheral 102 and rewrite the data in the RAM 112. As a result, the user cannot cancel the selection of the remote one-touch key in the selected state on the screen in FIG. 5. To solve the problem, the above-described operation is performed.

As described above, according to the present exemplary embodiment, when the remote one-touch key data in the RAM 112 is in the selected state, the multifunction peripheral 101 displays the data based on the remote one-touch key data in the RAM 112. Meanwhile, when the remote one-touch key data in the RAM 112 is in the deselected state, the multifunction peripheral 101 displays the data based on the data of the one-touch keys newly acquired from the multifunction peripheral (address management server) 102.

In other words, when the remote one-touch key is already selected, even if the user opens the remote one-touch screen again, the multifunction peripheral 101 does not acquire the remote one-touch key data from the multifunction peripheral (address management server) 102.

The processing prevents the remote one-touch key in the selected state at the multifunction peripheral 101 side from being affected even if the destination information assigned to the remote one-touch key at the address management server side is changed. For example, if the data of the remote one-touch key is erased at the multifunction peripheral (address management server) 102 side, in the RAM 112 at the multifunction peripheral 101 side, the data is still stored unless an event of pressing the reset key or an event of transmission start occurs. Consequently, at the multifunction peripheral 101 side, the remote one-touch key erased in the multifunction peripheral 102 can be used unless the above-described events occur.

In the storage of the data of the remote one-touch key into the RAM 112 at the multifunction peripheral 101 side, the information about the selected state or the deselected state is also stored. The configuration enables the user to use the remote one-touch keys acquired from the multifunction peripheral 102 functioning as server while maintaining the operability similar to that of the local one-touch keys. Specifically, if the user selects a remote one-touch key on the remote one-touch screen in FIG. 5, and the screen is transferred to another screen, and further the screen is transferred to the remote one-touch screen in FIG. 5 again, the selected state of the remote one-touch key selected in the past can be maintained.

In a state no remote one-touch key is selected on the remote one-touch screen 501 in FIG. 5, each time the remote one-touch screen 501 in FIG. 5 is displayed, the data of the one-touch keys is acquired from the multifunction peripheral 102. Consequently, based on the latest one-touch key data, the remote one-touch screen can be displayed.

According to the present exemplary embodiment, also on the remote one-touch key screen, the simple operability unique to the one-touch keys enabling the user to easily select and deselect a transmission destination by pressing a one-touch key in the selected state again can be ensured.

Once the transmission is started, the remote one-touch key data containing the information about the selected or deselected states of the remote one-touch keys stored in the RAM 112 in the multifunction peripheral 101 is erased. Also in the occurrence of an event of pressing the reset button or an auto clear event, the remote one-touch key data stored in the RAM 112 in the multifunction peripheral 101 is erased. As a result, after the processing, no remote one-touch key in the selected state exists. Consequently, in the display of the remote one-touch screen, the multifunction peripheral 101 acquires the latest remote one-touch key data from the address management server, and displays the data.

In the present exemplary embodiment, the example of the configuration to display the one-touch keys is described. Instead of the one-touch keys, for example, the present exemplary embodiment can be applied to a case the user transmits a document using an address book. For example, in the acquisition of data of the address book from the multifunction peripheral 102, the multifunction peripheral 101 determines whether the data of the address book is already stored in the RAM 112 and a transmission destination selected by the user from the address book is set in the selected destination display area 302. If the multifunction peripheral 101 determines that the transmission destination selected from the address book is set in the selected destination display area 302, the multifunction peripheral 101 displays the data of the address book already stored in the RAM 112 without newly acquiring the data of the address book from the multifunction peripheral 102.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A system including a first scanning apparatus and a second scanning apparatus, wherein the first scanning apparatus comprises:
    a first scanner unit configured to generate image data by scanning an image on a document;
    a first storage unit configured to store a first key name and a first transmission destination in association with a first one-touch key;
    a first display unit configured to display the first one-touch key, the first key name being displayed on the first one-touch key;
    a first setting unit configured to, based on a selection of the first one-touch key displayed by the first display unit, set the first transmission destination as transmission destination of the image data generated by the first scanner unit; and
    a first transmission unit configured to transmit the image data generated by the first scanning unit to the first transmission destination set by the first setting unit;
    wherein the second scanning apparatus comprises:
    a second scanner unit configured to generate image data by scanning an image on a document;
    a second storage unit configured to store a second key name and a second transmission destination in association with a second one-touch key;
    a second display unit configured to display the second one-touch key, the second key name being displayed on the second one-touch key;
    a second setting unit configured to, based on a selection of the second one-touch key displayed by the second display unit, set the second transmission destination as transmission destination of the image data generated by the second scanner unit; and
    a second transmission unit configured to transmit the image data generated by the second scanning unit to the second transmission destination set by the second setting unit;
    wherein the first scanning apparatus further comprises:
    a receiving unit configured to receive, from the second scanning apparatus, the second key name and the second transmission destination;
    wherein the first display unit displays a third one-touch key, the second key name received by the receiving unit is displayed on the third one-touch key,
    wherein the first setting unit, based on a selection of the third one-touch key, sets the second transmission destination as transmission destination of the image data generated by the first scanner unit, and
    wherein the first transmission unit transmits the image data generated by the first scanning unit to the second transmission destination set by the first setting unit.

2. The system according to claim 1, wherein the first and second transmission destination is one of an electronic mail address, a folder path, or a facsimile number.

3. The system according to claim 1, wherein the first one-touch key is a local one-touch key and the third one-touch key is a remote one-touch key.

4. The system according to claim 1, wherein the first one-touch key is highlighted based on the selection of the first one-touch key and the second one-touch key is highlighted based on the selection of the second one-touch key and the third one-touch key is highlighted based on the selection of the third one-touch key.

5. The system according to claim 1,
    wherein the first storage unit stores the first key name and the first transmission destination in association with a first key ID for identifying the first one-touch key, and
    wherein the second storage unit stores the second key name and the second transmission destination in association with a second key ID for identifying the second one-touch key.

6. The system according to claim 5, wherein the receiving unit receives the second key ID with the second key name and the second transmission destination.

7. The system according to claim 6,
    wherein the first scanning apparatus further comprises:
    a storage control unit that stores the second key ID received by the receiving unit with the second key name and the second transmission destination into the first storage unit, wherein the first display unit displays the third one-touch key based on the second key name stored in the first storage unit.

8. The system according to claim 7, wherein, upon transmission of the image data by the first transmission unit, the storage control unit deletes the first key ID, the first key name, the first transmission destination, the second key ID, the second key name, and the second transmission destination, stored in the first storage unit, from the first storage unit.

9. The system according to claim 3, wherein the first display unit, based on a user's instruction for displaying the local one-touch key, displays the first one-touch key in a key display area, and based on a user's instruction for displaying the remote one-touch key, displays the third one-touch key in the key display area, wherein either one of the first one-touch key or the third one-touch key is displayed in the key display area at a time based on the user's instruction.

10. The system according to claim 1,
wherein the first scanning apparatus further comprises;
a third storage unit configured to store an address book including a plurality of transmission destinations;
wherein the first display unit displays the address book stored in the third storage unit; and
wherein the first setting unit sets, as the transmission destination of the image data generated by the first scanner unit, a transmission destination selected by a user from among transmission destinations contained in the address book displayed by the first display unit.

\* \* \* \* \*